United States Patent Office 3,139,425
Patented June 30, 1964

---

3,139,425
17α,21-ALKOXY-METHYLENEDIOXY PREGNENES AND PREGNADIENES AND PROCESS THEREFOR
Alberto Ercoli, Milan, and Rinaldo Gardi, Carate Brianza, Italy, assignors to Francesco Vismara S.p.A., Casatenovo (Como), Italy, a corporation of Italy
No Drawing. Filed June 11, 1962, Ser. No. 201,296
Claims priority, application Italy June 24, 1961
9 Claims. (Cl. 260—239.55)

This invention relates to new 17α,21-cyclic orthoesters of steroids and particularly to 17α,21-(1′-alkoxy)methylenedioxy derivatives of $\Delta^4$-3-ketosteroids of the pregnane series. The invention further relates to a method of protecting the dihydroxy acetone side chain of a $\Delta^4$-3-ketopregnene compound by formation of a 17α,21-(1′-alkoxy) methylenedioxy derivative without the occurrence of undesirable side reactions.

It is known to prepare 16α,17α-substituted methylenedioxy derivatives from the corresponding 16α,17α,21-trihydroxy steroids (J. Am. Chem. Soc. 82, 4625; 1960). The reaction occurs by treating such trihydroxylated steroid with methyl- or ethyl-orthoformate in the presence of a strong mineral acid, such as concentrated hydrochloric acid or perchloric acid, at a temperature from about 15 to about 60° C.

The formation of a cyclic orthoester by the reaction of the vicinal cis-dihydroxy grouping of a 16α,17α,21-trihydroxy steroid cannot provide a satisfactory protection of the C-17-dihydroxy acetone side chain because only a portion of this chain is protected, that is the 17α-hydroxy group.

It is also known to prepare 17α,21-ethoxymethylenedioxy derivatives from the corresponding 17α,21-dihydroxy steroids (Belgian Patent No. 594,221). The method of the prior art consists in reacting a 17α,21-dihydroxy steroid with ethyl orthoformate under inert atmosphere, or preferably under nitrogen atmosphere, in the presence of p.toluensulfonic acid at a temperature not higher than room temperature. Under such reaction conditions, the 17α,21-dihydroxy steroid is converted to a 17α,21-ethoxymethylenedioxy derivative, while certain other functional groups present in the steroid molecule are subjected to modifications.

For example, if the starting 17α,21-dihydroxy steroid contains another hydroxy group at the 11-position, this group is removed during the treatment with ethyl-orthoformate under the above operative conditions and a dehydration occurs between the 9- and 11-positions, thus obtaining a 17α,21-ethoxymethylenedioxy derivative of a $\Delta^{9,11}$-unsaturated steroid.

Moreover, if the starting 17α,21-dioxy steroid contains a $\Delta^4$-3-keto functional group, a concurrent enol-etherification occurs, modifying the $\Delta^4$-3-ketogroup to a $\Delta^{3,5}$-diene-system. As result of the reaction with ethyl-orthoformate, a 3-ethoxy-$\Delta^{3,5}$-pregnadiene-17α,21-ethoxymethylenedioxy is obtained. From these derivatives the $\Delta^4$-3-ketogroup can be regenerated only by acid hydrolysis which treatment also regenerates the free C-17-dihydroxy-acetone side chain.

17α,21-ethoxymethylenedioxy steroids which have become unsaturated at the 9-11 position and have lost the original $\Delta^4$-3-ketogroup can no longer be employed as intermediates for the preparation, for instance, of 2-methylcorticoids, because the introduction of a methyl group at the 2-position of a 17α,21-dihydroxy steroid, by a Claisen condensation, requires the "deactivation" of the C-17-dihydroxy-acetone side chain and the "activation" of the C-2-position by the presence of a $\Delta^4$-3-ketogroup.

Since most of the biologically active corticosteroids contain a $\Delta^4$-3-ketogroup in addition to the dihydroxy-acetone side chain and frequently an 11β-hydroxy group, the prior art cannot be said to teach a satisfactory method for protecting the dihydroxy-acetone side chain by treatment with ethyl-orthoformate, concurrent reactions occurring to modify the structure of the steroid molecule.

Such modifications are often irreversible and prevent using the resulting steroids for further reactions.

It is an object of the present invention to provide a method for reacting a $\Delta^4$-3-keto corticosteroid with a lower alkyl orthoformate to form the protective 17α,21-(1′-alkoxy)methylenedioxy grouping with little or no modification of other portions of the steroid molecule.

Another object of the invention is to provide new compounds which are useful as intermediates in the preparation of physiologically active $\Delta^4$- and $\Delta^{1,4}$-3-keto steroids having the characteristic 17α,21-dihydroxy-acetone side chain.

Other objects of the invention will become evident from the following detailed explanation of our invention.

We have found that when a $\Delta^4$-3-keto 17α,21-dihydroxy steroid is treated in the presence of an acid catalyst, with a lower alkyl orthoformate in the solution of a suitable organic solvent at a temperature from about 60° to about 130° C., there is obtained only the protection of the dihydroxy-acetone side chain of the steroid without modifying the $\Delta^4$-3-keto functional group or, if present, the 11β-hydroxy group. Thus, we provide a new series of 17α,21-alkoxymethylenedioxy steroids which may be represented by the following structural formulae:

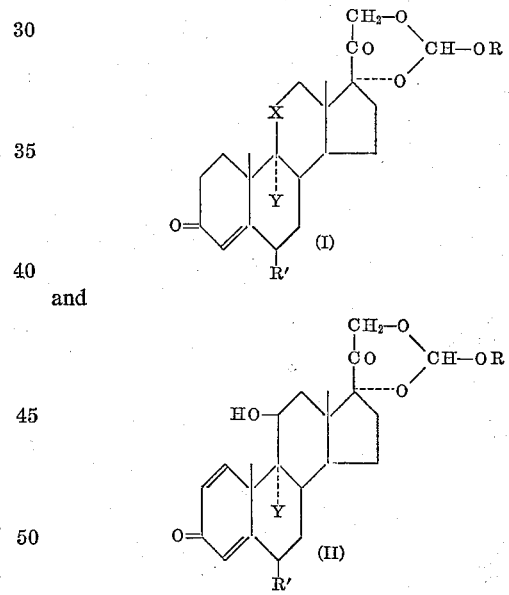

where X represents a methylene, β-hydroxymethylene or ketonic group, Y is hydrogen or fluorine, R represents a lower alkyl group containing from 1 to 3 carbon atoms, inclusive and R′ is hydrogen, halogen, preferably chlorine or fluorine, or methyl.

The method of the present invention consists in treating the $\Delta^4$-3-keto 17α,21-dihydroxy steroid with an excess of a lower alkyl orthoformate, such as methyl, ethyl, propyl or isopropyl orthoformate, preferably with methyl or ethyl orthoformate, in the presence of an acid catalyst and in carrying out the reaction in solution in an appropriate organic solvent, at a temperature ranging from 60° C. to 130° C. Preferably the temperature is maintained during the reaction between 75° C. and 115° C. and for this purpose it is advisable to use a solvent having a boiling point higher than 60° C. Preferred solvents are dimethylformamide, benzene, hexane, isoctane or halogenated solvents, such as chloroform and carbon tetrachloride. The acid catalysts of the reaction may be selected from sulfonic aromatic acids, for instance, toluen-, benzen-, or naphthalenesulfonic acid, Lewis acids, such as $SnCl_4$ or $SbCl_5$ and salts of organic bases with mineral acids, particularly pyridine hydrochloride.

The reaction mixture, consisting of the starting 17α,21-diol, the lower alkyl orthoformate and the acid catalyst in solution in one of the above mentioned solvents, is heated at the above temperature for a period of from 30 minutes to 4 hours. We have found that the most satisfactory yields of 17α,21-(1'-alkoxy)methylenedioxy steroids are realized by reacting the mixture in an apparatus equipped with a descending condenser. A portion of the solvent is distilled off and the remaining solution is neutralized by the addition of a few drops of pyridine. The 17α,21-alkoxymethylenedioxy steroids are then obtained by concentration of the reaction mixture to dryness in vacuo followed by recrystallization of the product in the usual manner.

Under our operating conditions the reaction proceeds quantitatively in the sense of the formation of the 17α,21-alkoxymethylenedioxy derivative. More specifically, enol-etherification of the $\Delta^4$-3-keto group is avoided and enol-ethers do not form even in traces detectable by paper chromatography. Also dehydration at the 9(11)-position does not occur when a 11β-hydroxy group is present.

It is to be pointed out that the 17α,21-alkoxymethylenedioxy steroids of Formulae I and II can be obtained in two stereoisomeric forms owing to the new asymmetric carbon atom bridged with the two hydroxyl groups at the 17α- and 21-positions. We have been able to isolate the two epimers and to identify them by the value of $[\alpha]_D$ and the melting point. We have also found that the stereospecific synthesis of either of the two epimers depends essentially from the acid catalyst chosen for the reaction. In the presence of an aromatic sulfonic acid, such as p-toluenesulfonic acid, only the epimer having the lesser value of $[\alpha]_D$ is obtained, while in the presence of a salt of an organic base with a mineral acid, such as pyridine hydrochloride, there is obtained the epimer having the higher value of $[\alpha]_D$. The 17α,21-alkoxymethylenedioxy derivatives are stable under basic conditions but are easily hydrolyzable with a mineral acid in hot methanol to regenerate the free alcohols in high yield. As contrasted with other derivatives which have been employed for protecting the dihydroxy-acetone side chain, such as 17(20), 20(21)-bismethylenedioxy or 20-ethyleneketals, the new 17,21-alkoxymethylenedioxy steroids of this invention contain at the 20-position a free carbonyl group which can thus be submitted to further transformations, for example reduction in an alkaline medium to give the corresponding 20-ol derivative. Hydrolysis with hydrochloric acid in boiling methanol will then provide 17α,20,21-trihydroxy steroids.

Therefore the compounds of this invention are useful as intermediates for the practical synthesis of physiologically active steroids.

In particular, the compounds of Formula I in which the dihydroxy-acetone side chain is protected while the $\Delta^4$-3-keto functional group is preserved are useful for the preparation of 2-methyl corticoids by reaction with diethyl oxalate and sodium methylate and treatment of the 2-enolate thus obtained with methyl iodide. By regenerating the dihydroxy-acetone side chain by treatment with mineral acids in hot methanol, a 2-methyl-$\Delta^4$-3,20-diketo-17α,21-dihydroxy steroid is obtained.

Furthermore the compounds of Formula I, where X is an hydroxymethylene group, and those of Formula II are useful for the preparation of esterified 11β-hydroxy steroids. This is readily accomplished by treatment with an acylating agent according to known procedures, followed by hydrolysis of the 17α,21-alkoxymethylenedioxy group with mineral acids as described above. The 11β-acyloxy-17α,21-dihydroxy steroids are, in turn, useful for the preparation of the corresponding 11β,21-dihydroxy steroids containing $\Delta^{16}$-unsaturation, by first eliminating water at the 16,17-position by treatment with phosphorus oxychloride or thionyl chloride and then hydrolyzing the 11β-acyloxy group with alkaline agents. This process would not be feasible with an unprotected 11β-hydroxy group since concurrent dehydration would occur at the 9(11)-position.

A further utility of the 17α,21-alkoxymethylenedioxy steroids of this invention lies in the fact they can be converted by hydrolysis under appropriate conditions to 17α- and 21-monoformates. We have found that if a 17α,21-alkoxymethylenedioxy steroid is treated with a diluted mineral acid, particularly hydrochloric acid, at room temperature or with an organic acid, particularly oxalic acid, with heating, there is obtained a mixture of 17α-monoformate and 21-monoformate which can be resolved by fractional crystallization. Thus the compounds of this invention make it possible to obtain the 17-monoformate of 17α,21-dihydroxy steroids.

The new compounds of this invention as well as the process for their preparation, are illustrated by the following examples in which for the sake of convenience, the epimer with lesser value of $[\alpha]_D$ is indicated as Form I and the epimer with higher value of $[\alpha]_D$ is indicated as Form II.

*Example 1*

To a mixture of 1.5 g. of $\Delta^{1,4}$-pregnadiene-11β,17α,21-triol-3,20-dione (prednisolone), 3 mg. of p.toluensulfonic acid and 600 cc. of anhydrous benzene contained in a flask equipped with a descending condenser there are added dropwise 1.2 cc. of methyl orthoformate (prepared as described by Pinner, Ber. 16, 1643; 1883). The mixture is distilled until the volume of the solution is reduced to 200 cc. The p-toluensulfonic acid is neutralized with a few drops of pyridine and the solvent evaporated under vacuum. The residue taken up with a small amount of methanol yields 17α,21-methoxymethylenedioxy-1,4-pregnadiene-11β-ol-3,20-dione (Form I), M. Pt. 221–223° C.; $[\alpha]_D = +97°$ (dioxan).

Under the same conditions, but employing as a catalyst pyridine hydrochloride instead of p.toluensulfonic acid, 17α,21-methoxymethylenedioxy-1,4-pregnadiene - 11β-ol-3,20-dione (Form II) is obtained, M. Pt. 140–142° C.; $[\alpha]_D = +130°$ (dioxan).

By substituting ethyl orthoformate (prepared as described by Pinner, Ber. 16, 1643; 1883) for methyl orthoformate, there is obtained 17α,21-ethoxymethylenedioxy-1,4-pregnadiene-11β-ol-3,20-dione, either as Form I, M. Pt. 198–200° C.; $[\alpha]_D = +85°$ (dioxan), or as Form II, M. Pt. 140–142° C.; $[\alpha]_D = +124°$ (dioxan).

The so obtained compounds can be hydrolyzed to 21-monoformates and 17α-monoformates by the following reaction sequence:

2 g. of 17α,21-ethoxymethylenedioxy-1,4,pregnadiene-11β-ol-3,20-dione (Form I) are treated with 20 cc. of methanol and 3 cc. of oxalic acid 2 N. After 15 minutes heating at 40–50° C. followed by evaporation, the resulting residue is taken up with dilute methanol and a crystalline product is recovered which is $\Delta^{1,4}$-pregnadiene-11β,17α,21-triol-3,20-dione-21-formate, M. Pt. 240–240° C.; $[\alpha]_D = +104°$ (dioxan).

By concentrating the mother liquor, 1 g. of $\Delta^{1,4}$-pregnadiene-11β,17α,21-triol-3,20-dione-17-formate, M. Pt. 238–241° C.; $[\alpha]_D = +25°$ (dioxan), is isolated. After recrystallization from methanol, the melting point rises to 244–245° C.; $[\alpha]_D = +20°$ (dioxan).

In a similar manner, starting from 17α,21-ethoxymethylenedioxy - 1,4 - pregnadiene - 11β - ol - 3,20 - dione (Form II), the same $\Delta^{1,4}$-pregnadiene-11β,17α,21-triol-3,20-dione-17-formate, in corresponding yield, is obtained.

*Example 2*

In a 100 cc. flask equipped with a descending condenser, is placed a solution of 2 g. of $\Delta^4$-pregnene-17α,21-diol-3,20-dione (compound S), 5 mg. of p.toluensulfonic acid and 1.8 cc. of ethyl orthoformate in 2 cc. of dimethylformamide. The mixture is heated up to 110° C. and ethyl alcohol which has formed during the reaction is collected and distilled off. After 3 hours' heating, the p.toluensulfonic acid is neutralized with a few drops of pyridine and the solution is evaporated under vacuum. The residue taken up with a small amount of methanol and evaporated again yields 17α,21-ethoxymethylenedioxy-4-pregnene-3,20-dione (Form I) in an oily state; $[\alpha]_D = +93°$ (dioxan).

Under the identical conditions described above, employing as catalyst pyridine hydrochloride instead of p.toluensulfonic acid, 17α,21-ethoxymethylenedioxy-4-pregnene-3,20-dione (Form II) is obtained, M. Pt. 147–149° C.; $[\alpha]_D = +144.5°$ (dioxan).

Example 3

A mixture consisting of 2.5 g. of Δ⁴-pregnene-11β,17α-21-triol-3,20-dione (hydrocortisone), 10 mg. of pyridine hydrochloride, 2 cc. of ethyl orthoformate and 2.5 cc. of dimethylformamide is heated up to 115° C. for approximately 3 hours, then the solution is neutralized and evaporated under vacuum. Thus 17α,21-ethoxymethylenedioxy-4-pregnene-11β-ol-3,20-dione (Form II) is obtained, M. Pt. 195–197° C.; $[\alpha]_D = +170°$ (dioxan). By operating under the same conditions as described above, but employing as catalyst benzensulfonic acid instead of pyridine hydrochloride, 17α,21-ethoxymethylenedioxy-4-pregnene-11β,ol-3,20-dione (Form I) is obtained, M. Pt. 130–133° C.; $[\alpha]_D = +120°$ (dioxan).

The utility of the so obtained 17α,21-ethoxymethylenedioxy-4-pregnene-11β-ol-3,20-dione as an intermediate, is shown by the following example:

A suspension of 5 g. of 17α,21-ethoxymethylenedioxy-4-pregnene-11β-ol-3,20-dione in 100 cc. of t.butyl alcohol is treated with 2 g. of sodium methoxide and, then, with 2.8 cc. of diethyl oxalate. The resulting mixture is stirred for 6 hours and diluted with ether. The precipitate which forms is taken up with 250 cc. of acetone and refluxed for 20 hours in the presence of 8 g. of potassium carbonate and 30 cc. of methyl iodide. After filtration, the mixture is concentrated under vacuum, diluted with water and extracted with ethyl acetate. The oily residue, obtained by evaporating the solvent, is dissolved in 200 cc. of absolute ethyl alcohol and reacted with 650 mg. of sodium methoxide.

After standing at room temperature for 4 hours, the mixture is treated with dilute hydrochloric acid, heated for 15 minutes on a water-bath, concentrated in vacuo and extracted with ethyl acetate.

By eliminating the solvent, a vitreous residue is obtained that is purified by chromatography, to obtain, in a crystalline state, 2α-methyl-4-pregnene-11β,17α,21-triol-3,20-dione.

Example 4

2 g. of Δ⁴-pregnene-17α,21-diol-3,11,20-trione (cortisone), 10 mg. of sulfosalicylic acid, 2 mg. of ethyl orthoformate and 600 cc. of isoctane are heated and 450 cc. of the mixture are distilled, then neutralized with a few drops of triethylamine and the solvent is evaporated under vacuum. The residue taken up with ethanol, yields 17α,21-ethoxymethylenedioxy - 4 - pregnene - 3,11,20 - trione (Form I), M. Pt. 187–188° C.; $[\alpha]_D = +163°$ (dioxan).

Under the same conditions but employing as catalyst triethylamine hydrochloride instead of sulfosalicylic acid, 17α,21-ethoxymethylenedioxy-4-pregnene-3,11,20-trione is obtained (Form II), M. Pt. 164–166° C.; $[\alpha]_D = +198°$ (dioxan).

Example 5

A mixture of 3 g. of 9α-fluoro-Δ¹,⁴-pregnadiene-11β,17α,21-triol-3,20-dione, 10 mg. of p.toluensulfonic acid, 3 cc. of dimethylformamide and 3 cc. of ethyl orthoformate are heated to 110° C. After 4 hours' heating, the solution is neutralized by addition of a few drops of pyridine and evaporated under vacuum. The residue taken up with methanol yields 9α-fluoro-17α,21-ethoxymethylenedioxy-1,4-pregnadiene-11β,ol-3,20-dione, Form I), M. Pt. 212–214° C.; $[\alpha]+_D = 85°$ (dioxan).

Example 6

2 g. of 9α-fluoro-Δ⁴-pregnene-11β,17α,21-triol-3,20-dione are suspended in 800 cc. of carbon tetrachloride with 4 mg. of tin tetrachloride. The mixture while being distilled for a few minutes is treated with 1.5 cc. of methyl orthoformate and evaporated to reduce the volume to 200 cc. After addition of a few drops of pyridine the solvent is evaporated in vacuo. The residue taken up with a small amount of methanol consists of 9α-fluoro-17α21-methoxymethylenedioxy - 4 - pregnene - 11β,ol - 3,20-dione (Form I). Similarly, but employing pyridine hydrochloride as catalyst, 9α-fluoro-17α,21-methoxymethylenedioxy-4-pregnene-11β-ol-3,20-dione (Form II) is obtained.

In the same manner as above, there are prepared 6α-chloro - 17α-21 - ethoxymethylenedioxy - 4 - pregnene-11β-ol-3,20-dione (Form I), the corresponding 6α-chloro-17α,21 - ethoxymethylenedioxy - 4 - pregnene - 11β - ol-3,20-dione (Form II), 6α-fluoro-17α,21-ethoxymethylenedioxy-4-pregnene-11β-ol-3,20-dione and 6α-methyl-17α,21-ethoxymethylenedioxy - 4 - pregnene - 11β - ol - 3,20 - dione in both Form I and Form II.

Example 7

To 1000 cc. of anhydrous isoctane, are added 3 g. of 6α - chloro-Δ⁴-pregnene-17α,21-diol-3,11,20-trione and 5 mg. of p.toluensulfonic acid. To the resulting mixture are added dropwise 2 cc. or ethyl orthoformate. By distilling in vacuo, a solid separates which after crystallization from ethanol gives 6α-chloro-17α,21-ethoxymethylenedioxy-4-pregnene-3,11,20-trione (Form I). Under the same conditions but employing pyridine hydrochloride instead of p.toluensulfonic acid, 6α-chloro-17α,21-ethoxymethylenedioxy-4-pregnene-3,11,20-trione (Form II) is obtained.

Similarly there is prepared:

6α - fluoro - 17α,21 - ethoxymethylenedioxy-4-pregnene-3,11,20-trione (Form I and Form II);

6α - methyl - 17α,21-methoxymethylenedioxy-4-pregnene-3,11,20-trione (Form I and Form II).

Example 8

2.5 g. of 6β-chloro-Δ⁴-pregnene-17α,21-diol-3,20-dione and 5 mg. of benzensulfonic acid are suspended in 2.5 cc. of dimethylformamide. The resulting mixture is treated with 2 cc. of methylorthoformate and following the procedure described in Example 2, 6β-chloro-17α,21-methoxymethylenedioxy-4-pregnene-3,20-dione (Form I) is obtained.

By substituting pyridine hydrochloride for benzensulfonic acid, Form II of this compound is obtained.

Similarly the following compounds are prepared:

6α - fluoro - 17α,21 - ethoxymethylenedioxy-4-pregnene-3,20-dione (Form I);

6α - fluoro - 17α,21 - ethoxymethylenedioxy - 4 - pregnene-3,20-dione (Form II);

6β - methyl - 17α,21-isopropoxymethylenedioxy-4-pregnene-3,20-dione (Form I);

6β - methyl - 17α,21 - isopropoxymethylenedioxy-4-pregnene-3,20-dione (Form II).

Example 9

By treating, as described in Example 1, a mixture of 3 g. of 6α - methyl-9α-fluoro-Δ⁴-pregnene-11β,17α,21-triol-3,20-dione, 5 mg. of p.toluensulfonic acid and 1200 cc. of benzene with 4 cc. of ethylorthoformate, 6α-methyl-9α-fluoro-17α,21-ethoxymethylenedioxy-4-pregnene-11β-ol-3,20-dione (Form I) is obtained.

Under the same conditions, but employing as catalyst pyridine hydrochloride, 6α - methyl - 9α - fluoro-17α,21- ethoxymethylenedioxy - 4 - pregnene - 11β-ol-3,20-dione (Form II) is prepared.

By substituting equivalent quantities of 6α,9α-difluoro-Δ⁴-pregnene - 11β,17α,21 - triol - 3,20-dione, there is prepared 6α,9α - difluoro-17α,21 - ethoxymethylenedioxy - 4 - pregnene-11β-ol-3,20-dione in both Form I and Form II.

*Example 10*

3.5 g. of 6α - chloro - 1,4 - pregnadiene-11β,17α,21-triol-3,20-dione in 3.5 cc. of dimethylformamide are reacted with 5 mg. of p.toluensulfonic acid and 2.5 cc. of methyl orthoformate in the manner described in Example 2 and the resultant product is isolated and purified to give 6α-chloro-17α,21 - ethoxymethylenedioxy - 1,4 - pregnadiene-11β-ol-3,20-dione (Form I).

Under the identical conditions described above but employing as catalyst pyridine hydrochloride, 6α-chloro-17α,21-ethoxymethylenedioxy - 1,4 - pregnadiene-11β-ol-3,20-dione (Form II) is obtained.

In the same manner as above the following compounds are prepared:

6α - fluoro - 17α,21 - propoxymethylenedioxy - 1,4 - pregnadiene-11β-ol-3,20-dione (Form I) and
6α - fluoro - 17α,21 - propoxymethylenedioxy - 1,4 - pregdiene-11β-ol-3,10-dione (Form II);
6α - methyl - 17α,21 - ethoxymethylenedioxy - 1,4 - pregnadiene-11β-ol-3,20-dione (Form I) and
6α - methyl - 17α,21 - ethoxymethylenedioxy - 1,4-pregnadiene-11β-ol-3,20-dione (Form II);
6α - methyl - 9α - fluoro-17α,21-ethoxymethylenedioxy-1,4-pregnadiene-11β-ol-3,20-dione (Form I) and
6α - methyl - 9α - fluoro-17α,21-ethoxymethylenedioxy-1,4-pregnadiene-11β-ol-3,20-dione (Form II).

We claim:

1. A compound selected from the group consisting of a compound of the formula:

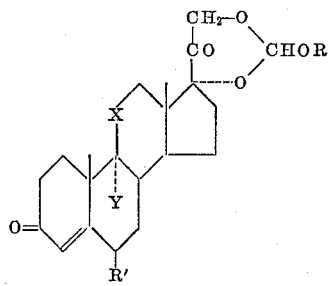

and a compound of the formula:

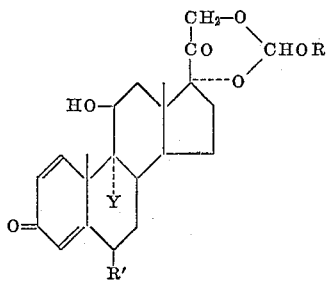

wherein X is selected from the group consisting of methylene, β-hydroxymethylene and carbonyl groups, Y is selected from the group consisting of hydrogen and fluorine, R is selected from the group consisting of lower alkyl groups of from 1 to 3 carbon atoms and R' is selected from the group consisting of hydrogen, chlorine, fluorine and methyl.

2. 17α,21 - ethoxymethylenedioxy - 4 - pregnene - 3,20-dione.

3. 17α,21 - ethoxymethylenedioxy-4-pregnene-3,11,20-trione.

4. 17α,21-ethoxymethylenedioxy - 4 - pregnene-11β-ol-3,20-dione.

5. 17α,21-ethoxymethylenedioxy - 1,4 - pregnadiene-11β-ol-3,20-dione.

6. 17α,21-ethoxymethylenedioxy - 9α - fluoro-1,4-pregnadiene-11β-ol-3,20-dione.

7. 17α,21 ethoxymethylenedioxy - 6α - fluoro - 4 - pregnene-11β-ol-3,20-dione.

8. 17α,21 - ethoxymethylenedioxy - 6α - methyl - 4-pregnene-11β-ol-3,20-dione.

9. A method of preparing a compound selected from the group consisting of a compound of the formula:

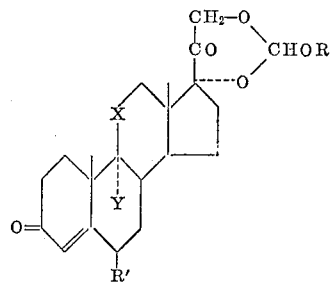

and a compound of the formula:

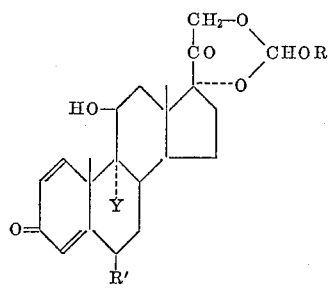

wherein X is selected from the group consisting of methylene, β-hydroxymethylene and carbonyl groups, Y is selected from the group consisting of hydrogen and fluorine, R is selected from the group consisting of lower alkyl of from 1 to 3 carbon atoms and R' is selected from the group consisting of hydrogen, chlorine, fluorine and methyl which method comprises reacting the corresponding 17α,21-dihydroxy steroid with a lower alkyl orthoformate in the presence of an acid catalyst selected from the group consisting of sulfonic aromatic acids, Lewis acids and pyridine hydrochloride, in solution in an organic solvent selected from the group consisting of dimethylformamide, benzene, hexane, isoctane, chloroform and carbon tetrachloride at a temperature from 60° to 130° C.

References Cited in the file of this patent

Smith et al.: J.A.C.S., 82, 1960, pages 4625–4629.
Tanabe et al.: J.A.C.S., 83, February 5, 1961, pages 756 and 757.